United States Patent
Tey Pons et al.

(10) Patent No.: US 9,877,369 B2
(45) Date of Patent: Jan. 23, 2018

(54) LIGHTING DEVICE AND METHOD FOR MANAGING A LIGHTING SYSTEM

(71) Applicant: LIGHTING INTELLIGENCE, S.L., Barcelona (ES)

(72) Inventors: Francisco Javier Tey Pons, Barcelona (ES); Jaume Portell Guarch, Barcelona (ES)

(73) Assignee: LIGHTING INTELLIGENCE, S.L., Barcelona (ES)

(*) Notice: Subject to any disclaimer, the term of this patent is extended or adjusted under 35 U.S.C. 154(b) by 0 days.

(21) Appl. No.: 14/769,028

(22) PCT Filed: Feb. 19, 2014

(86) PCT No.: PCT/EP2014/053233
§ 371 (c)(1),
(2) Date: Aug. 19, 2015

(87) PCT Pub. No.: WO2014/128162
PCT Pub. Date: Aug. 28, 2014

(65) Prior Publication Data
US 2016/0007421 A1 Jan. 7, 2016

(30) Foreign Application Priority Data

Feb. 19, 2013 (EP) .................................. 13382049
Feb. 19, 2013 (EP) .................................. 13382050

(51) Int. Cl.
*H05B 33/08* (2006.01)
*H05B 37/02* (2006.01)
*F21V 29/70* (2015.01)

(52) U.S. Cl.
CPC ......... *H05B 33/0854* (2013.01); *F21V 29/70* (2015.01); *H05B 33/0872* (2013.01);
(Continued)

(58) Field of Classification Search
CPC ............ H05B 33/0803; H05B 33/0818; H05B 33/0845; H05B 37/0218; H05B 37/0245;
(Continued)

(56) References Cited

U.S. PATENT DOCUMENTS

| 6,548,967 B1 * | 4/2003 | Dowling | G06Q 30/0201 315/307 |
| 7,961,113 B2 * | 6/2011 | Rabiner | H05B 33/0842 340/12.32 |

(Continued)

FOREIGN PATENT DOCUMENTS

| CN | 102448218 A | 5/2012 |
| WO | 0225842 A2 | 3/2002 |

(Continued)

OTHER PUBLICATIONS

International Search Report dated Aug. 27, 2014 in International Application No. PCT/EP2014/053233.

(Continued)

*Primary Examiner* — Haissa Philogene
(74) *Attorney, Agent, or Firm* — Polsinelli PC

(57) ABSTRACT

Lighting device including a plurality of lighting elements, at least one sensor receiving sensory stimuli from an establishment, and a control means connected with the at least one sensor and with the lighting elements. The control means can send lighting management instructions to the lighting elements depending on the captured and processed information. The lighting device also allows managing lighting in an intelligent manner. The lighting device can light with greater intensity the areas of an establishment where there are more people or the areas where greater attention is needed but are not visited often enough. The lighting device can also light in any other suitable manner depending on the (Continued)

information provided by the implemented sensory metrics or other independent business rules.

13 Claims, 2 Drawing Sheets

(52) U.S. Cl.
CPC ..... *H05B 37/0227* (2013.01); *H05B 37/0236* (2013.01); *H05B 37/0272* (2013.01); *Y02B 20/48* (2013.01)

(58) Field of Classification Search
CPC  H05B 37/0272; H05B 37/0236; H05B 37/02; H05B 37/0227; H05B 37/0281; Y02B 20/46; Y02B 20/48
USPC ........ 315/318, 307, 312, 362, 149, 159, 360
See application file for complete search history.

(56) References Cited

U.S. PATENT DOCUMENTS

| | | | | |
|---|---|---|---|---|
| 8,197,085 B2* | 6/2012 | Spartano | ................. | F21L 4/027 |
| | | | | 315/209 R |
| 8,519,566 B2* | 8/2013 | Recker | ................... | H02J 9/065 |
| | | | | 307/64 |
| 2005/0275626 A1* | 12/2005 | Mueller | ............... | H05B 37/029 |
| | | | | 345/156 |
| 2010/0148672 A1 | 6/2010 | Hopper | | |
| 2010/0277082 A1 | 11/2010 | Reed et al. | | |
| 2011/0121654 A1 | 5/2011 | Recker et al. | | |
| 2012/0038490 A1 | 2/2012 | Verfuerth | | |
| 2012/0293652 A1 | 11/2012 | Farmer | | |

FOREIGN PATENT DOCUMENTS

| | | |
|---|---|---|
| WO | 2007110791 A1 | 10/2007 |
| WO | 2011037475 A1 | 3/2011 |

OTHER PUBLICATIONS

Database WPI Week 201244 Thomson Scientific, London, GB; AN 2012-F95555 XP002714564, CN102 448 218 A (Shanghai Jinyuan Senior High School); May 9, 2012 (May 9, 2012); abstract.

Extended European Search Report dated Sep. 3, 2013; European Application No. 13382050.6.

Extended European Search Report dated Oct. 18, 2013; European Application No. 13382049.8.

English Abstract of CN102448218; Published May 9, 2012; retrieved from www.espacenet.com on Nov. 30, 2015.

* cited by examiner ered by reference in their entireties.

LIGHTING DEVICE AND METHOD FOR MANAGING A LIGHTING SYSTEM

CROSS-REFERENCE TO RELATED APPLICATIONS

The present application is a national stage entry of International Application Number PCT/EP2014/053233, filed 19 Feb. 2014, which claims priority to European Application 13382049.8 filed 19 Feb. 2013 and European Patent Application 13382050.6, filed 19 Feb. 2013, each of the applications are hereby incorporated by reference in their entireties.

The present invention relates to a lighting device which allows managing the lighting of an establishment based on the data coming from mobile devices and/or from sensors.

The present invention also relates to a method for managing a lighting system based on data received from mobile devices and/or sensors.

BACKGROUND OF THE INVENTION

The use of a lighting system which correctly lights all the areas depending on the use thereof is necessary in establishments such as business premises. Therefore, areas to be emphasized or which are envisaged to have a greater number of visitors are usually lit with greater intensity.

The lighting in said establishments covers the entire working surface, with a greater emphasis on those places where products or services are offered and for the purpose of guiding people through specific routes.

Therefore, the most common purpose of lighting systems is to favor the use of public or private spaces, improving the user's experience of said spaces and emphasizing the usefulness of the services offered therein.

In fact, the customer's experience in those business premises, and specifically at each different point of these business premises, is greatly conditioned by light intensity, its color, its beam and its chromatic reproduction, but it is also influenced by other factors such as sound, temperature and ambient humidity.

However, despite their strategic location, conventional lighting systems act as mere light emitters without measuring in any way whatsoever the experience at the point where they are installed, losing the opportunity of automatically or manually making decisions that transform the customers' experience, improving it or adapting it to the rationale behind said space and to the specific conditions of each moment.

On the other hand, today in business it is common to use data to analyze activities or factors that condition company results. For example, users' preferred choices of products in a business premise can be known today and decisions can be made depending on said data, for example changing the arrangement of the goods to be sold or to be put on sale, etc.

Despite significant data being available for some of the key factors in business results, data representing the customer's sensory experience in the business premise, i.e., the lighting level, number of people occupying the space, arrangement by areas in the shop, sound level at each point, temperature and humidity, etc., is not available today.

Therefore, it is evident that there is a need for a lighting device which allows obtaining sensory evidence in an integral manner, taking advantage of the strategic location thereof, which allows understanding the fundamental factors making up the experience at the point of sale, and which provides mechanisms for managing the lighting of an establishment, such as a business premise, depending on the actual wirelessly obtained data.

The lighting device and the managing method must therefore incorporate the capacity to collect sensory evidence, specifically to measure light intensity, to measure temperature and humidity, to measure ambient sound, to estimate the number of people present in the establishment by means of capturing radio signals coming from their mobile telephones or other devices and to use cameras for identifying the physical presence of people and their paths.

The lighting device and the managing method will in turn be complemented by a mechanism capable of collecting other determinant information, such as the weather in the town where the establishment is located, the outdoor temperature and humidity, the sales made at all times and combining this information with the data collected by the lighting device under the exact same time pattern.

Therefore, a first objective of the present invention is to provide a lighting device and a managing method which allows capturing the mentioned sensory evidence in a synchronized manner, generating valuable data for the owners of the establishment, and at the same time allowing intelligent lighting management according to business rules that are or are not linked with the taken metrics. Furthermore, a second objective of the present invention is to enable easily converting conventional lighting fixtures into the lighting device of the present invention by simply connecting a module in a conventional lighting fixture, with the evident economical benefit that it would entail.

DESCRIPTION OF THE INVENTION

The lighting device and the managing method of the invention successfully solves the mentioned drawbacks, having other advantages which will be described below.

The lighting device of the present invention comprises a plurality of lighting elements and is characterized in that it comprises:

a sensor receiving sensory stimuli from an establishment, for example, an antenna receiving information from a plurality of electronic devices (mobiles, computers, tablets, etc.) located in said establishment; and control means connected with said at least one sensor and with said lighting elements such that said control means send lighting management instructions to said lighting elements depending on the information received from the network based on the captured sensory metrics or other determinant data available (time of day, outdoor temperature and humidity, average metrics, trends, etc.)

Furthermore, the device of the present invention can comprise other sensors, such as temperature and humidity sensors, light intensity sensors, digital cameras, etc.

As a result of this feature, the lighting is successfully managed in an intelligent manner, for example, by lighting with greater intensity the areas of an establishment where there are more people or the areas where greater attention is needed but are not visited often enough, or in any other suitable manner depending on the information provided by the implemented sensory metrics or other independent business rules.

In turn, as a result of this invention highly relevant data is captured in a completely synchronized manner which allows understanding the experience offered in the environment where the lighting elements perform their task.

Advantageously, said control means are connected to said plurality of lighting elements through a lighting controller.

According to a preferred embodiment, said control means comprise means for data input and output, such as a memory card reader and/or a USB port, for example, or any suitable element.

Said control means preferably comprise a microprocessor and said plurality of lighting elements are placed in a lighting module comprising a heat sink for dissipating the heat caused by said lighting elements, a printed circuit board on which the lighting elements are located and optical elements through which the light emitted by said lighting elements passes.

According to a preferred embodiment, said lighting controller comprises a converter that adjusts the intensity or voltage, accordingly the light, depending on the commands from a microcontroller.

Said controller of said lighting elements preferably comprises a microswitch and said lighting elements are light-emitting diodes.

Advantageously, said at least one sensor and the control means are housed in a casing. Therefore, said casing which comprises the sensor or sensors and the control means therein can be connected to a conventional lighting fixture which includes the lighting elements, with the subsequent economic saving that it represents and with the advantage of being able to transform conventional lighting fixtures into the device of the present invention in a very simple manner.

In this case, the device of the present invention will be formed by the sensor or sensors and the control means in said casing and by the lighting elements of a conventional lighting fixture.

If desired, the sensor or sensors can be associated with a USB controller.

According to a second aspect, the method for managing a lighting system of the present invention is characterized in that it comprises the steps of:
   detecting sensory stimuli, producing a plurality of corresponding signals;
   sending said signals to a database;
   integrating all the signals sent to said database to generate reports, correlations and/or patterns;
   performing one or several actions on the lighting system depending on the obtained reports, correlations and/or patterns.

Advantageously, the actions performed on the lighting system comprise:
   turning the lights on/off;
   changing light intensity;
   changing the color of the lights; and/or
   changing the pattern of the lights in a modulated manner.

In the method for managing a lighting system according to the present invention, the step of detecting sensory stimuli preferably comprises wirelessly detecting the presence of people in an establishment, the temperature, the humidity, the noise level, the brightness level, the distance from moving objects or people, or external events, which also produce a plurality of corresponding signals that are sent to said database and integrated to generate said reports, said correlations or said patterns.

According to a preferred embodiment, wirelessly detecting the presence of a plurality of users is performed by means of WiFi or Bluetooth.

Advantageously, human movement maps, light point maps, noise level maps, and/or temperature maps are generated based on integrating all the signals sent to said database.

Furthermore, the step of integrating all the signals sent to said database comprises synchronizing said signals over time.

The method of the present invention successfully achieves the following advantages:
   adjusting users' experience with respect to the lighting;
   reacting to different experience factors in real time;
   saving energy consumption since the lighting will be efficiently managed depending on the actual needs of the users;
   obtaining maps providing information in real time which can be remotely managed at all times.

The device and the method of the present invention allow to unambiguously identify a particular mobile phone using the MAC address of Wifi or Bluetooth and consequently associate with the presence of a particular person in areas of a shop. Such identification can be totally anonymous or customized if the person permits it.

Thanks to the unambiguous identification, all sensors can track the phone or mobile device in the physical space and collect all kinds of data, as well as eventually to also make decisions in real time on the lighting of the areas where it goes. For example, it allows to:
   predict where the mobile device goes and the light is turned on in that area before the customer gets there. This is possible thanks to the historical knowledge of the system of customer transits by that space. This activation can be carried out progressively prior the customer presence and it can be not visually perceptible, or at the time of the arrival of the client to that area is detected.
   adjust the lighting to the preferences of a particular customer based on the presence of his/her mobile device in the area. The customer preferences can be detected explicitly by active questioning from a mobile application, by manual entry into the system of lighting parameters for a particular customer or by passive deduction based on the detection of preferences related to the presence of a device in a given area. For example, when a customer enters a specific area, the customer himself/herself lows the intensity of the light by a wall regulator, when the pattern has been repeated several times the software can deduce that there is a correlation between that device preference and the level of intensity, and this action can be advanced when it detects the presence of the device;
   deduct the external factors strongly correlated with certain behaviors of the customers, such as: understanding the levels of lighting intensity according with the movements of each device in the commercial space (by monitoring of device through the sensors) and how it has influenced the customer behavior regarding its presence in the purchase area or in any other area or behavior that is analyzed by the retailer.

BRIEF DESCRIPTION OF THE DRAWINGS

To better understand the foregoing, drawings schematically depicting a practical embodiment only by way of non-limiting example are attached.

DESCRIPTION OF A PREFERRED EMBODIMENT

Figure 1:
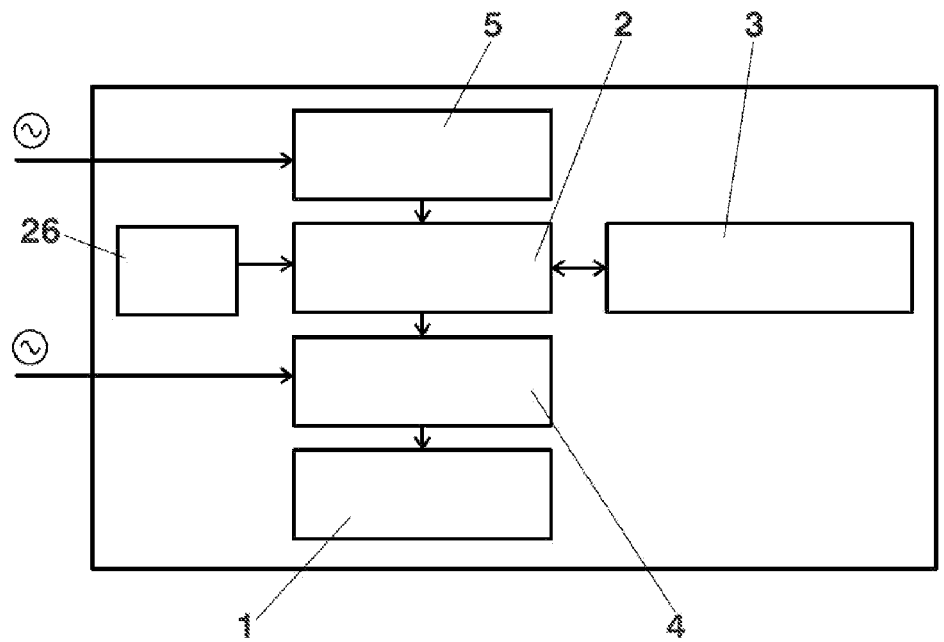
FIG. 1 is a block diagram of the components of the lighting device of the present invention.

FIG. 1 depicts a block diagram of the lighting device of the present invention.

As can be seen in this diagram, the device of the present invention is formed by:
- a lighting module, generally indicated by means of reference number 1, comprising a plurality of lighting elements 10, for example, light-emitting diodes or any suitable lighting element;
- control means, generally indicated by means of reference number 2, comprising a microprocessor 20;
- at least one first sensor 3 which transmits data coming from mobile devices to said control means 2, and which can have its own USB controller;
- a set of additional sensors which could be connected through the USB interface or through any other interface;
- a lighting controller, generally indicated by means of reference number 4, receiving the instructions coming from the control means 2 and sending a corresponding current or voltage signal to said lighting module 1; and
- an energy source 5 providing energy to said control means 2.

It must be indicated that said sensor or sensors 3 can comprise a WiFi antenna, a Bluetooth antenna, a light sensor, a temperature sensor, a humidity sensor, a sound sensor and/or a camera, or any suitable sensor.

Figure 2:
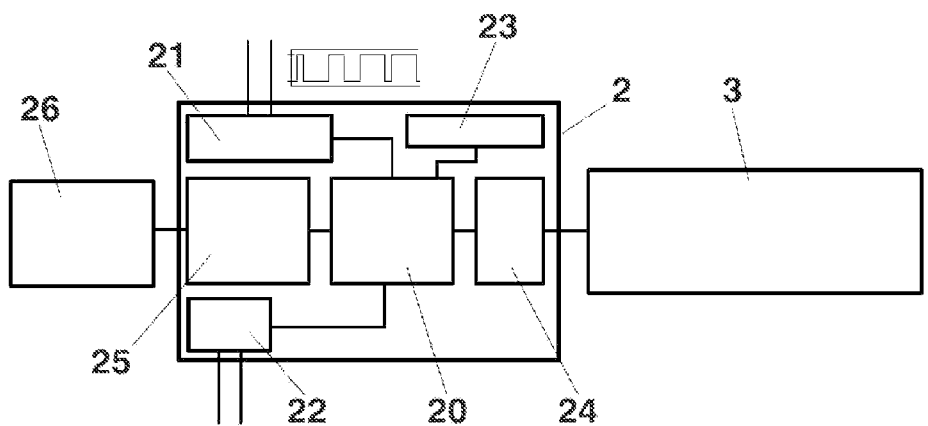
FIG. 2 is a block diagram of the components of the control means of the lighting device of the present invention.

Said control means 2 are described below in reference to FIG. 2, and they comprise a microprocessor 20 to which there are connected an input/output connection 21, a power source 22, a lighting element indicator 23 and, according to the depicted embodiment, a USB port 24 and a reader 25 for memory cards 26, which allow storing the data in a physical medium. Furthermore, the operating system can be included in the memory card 26.

Figure 3:
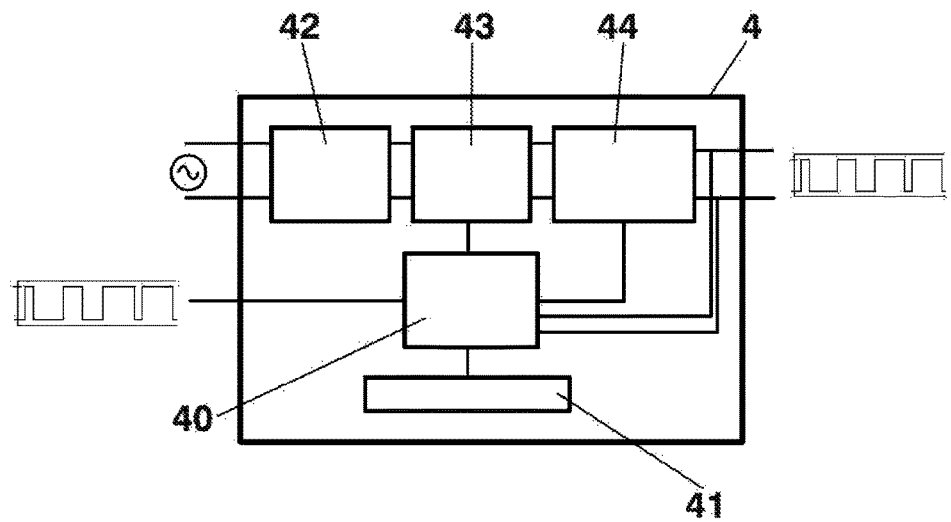
FIG. 3 is a block diagram of the controller of the lighting elements of the lighting device of the present invention.

Said lighting controller 4 is described below in reference to FIG. 3, and said lighting controller comprises a microcontroller 40 connected to a microswitch 41, an electromagnetic interference filter 42, a power factor corrector 43 and a converter 44. Said lighting controller 4 allows configuring the current or voltage exiting it and which it provides to the lighting module or light source 1. Said microcontroller 40 controls the power factor corrector 43 and the converter 44.

Figure 4:
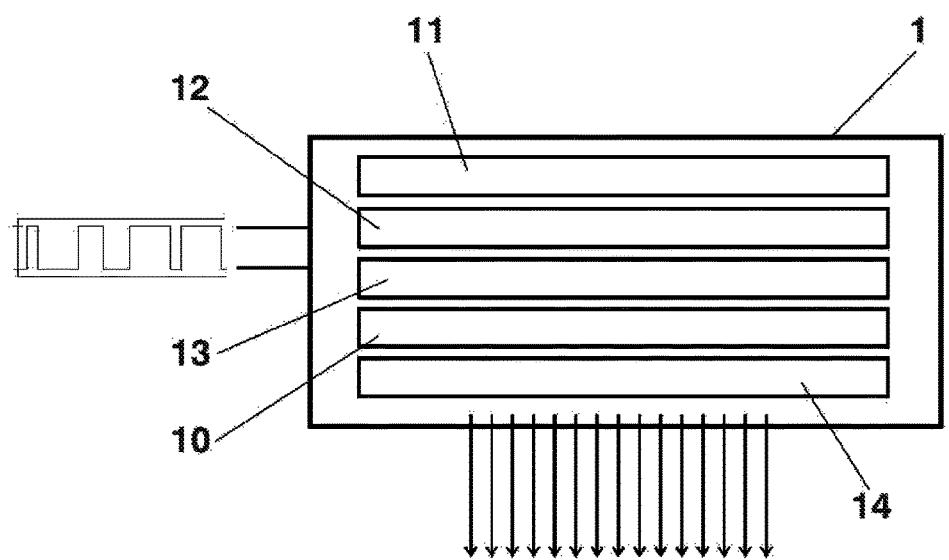
FIG. 4 is a block diagram of the lighting module of the lighting device of the present invention.

The lighting module 1 depicted in FIG. 4 in turn comprises a heat sink 11 for dissipating the heat caused by the lighting elements 10, a printed circuit board 13 on which the lighting elements are located and optical elements 14 through which the light emitted by said lighting elements passes. Furthermore, a thermal interface material 12 is arranged between the heat sink 11 and the printed circuit board 13. By using different optical elements 14, it is possible to provide different angles and patterns to the emitted light.

It must be indicated that it is not essential for the lighting module 1 to be integrated in a single block with the rest of the components of the device of the present invention, rather the lighting module could be a conventional lighting fixture provided with its own lighting elements. Therefore, any lighting fixture known today could be transformed into the lighting device of the present invention in a very simple manner.

To that end, the control means 2 and the sensor or sensors 3 could be placed inside a casing which could be connected to a conventional lighting fixture of any type, even embedded in the ceiling.

The operation of the lighting device of the present invention is as follows.

The sensors perform continuous measurement;

Information is captured from the sensors in different modes: in a continuous manner at predetermined intervals, or in a discontinuous manner according to specific events;

The microprocessor captures data from all the sensors and processes the data locally, sends the data to an external server in a local network or directly to servers by means of wired or wireless connections.

The microprocessor obtains data from the sensors in different modes being able to be varied depending on the type of sensor and different modes being able to be used for the same sensor depending on the circumstances. The common mechanisms are as follows:

By means of punctually read continuous metrics:
a) temperature and humidity sensor;
b) sound sensor;
c) light sensor (color, intensity and chromatic reproduction).

By means of continuous metrics and thorough analysis of the obtained data:
a) sensor for sensing the presence of people by means of detecting WiFi or Bluetooth devices;
b) sensor for sensing the presence of people or products by means of analyzing the video signal generated by the camera connected to the device.

The detection of the presence of people is carried out by means of two different mechanisms, on one hand, as a result of actively listening for devices that emit radio signals, and on the other hand with active interrogation, as in the case of Bluetooth, where the microprocessor will carry out discovery transmissions by means of a Bluetooth antenna to receive answers from the visible surrounding devices.

In the case of active listening, the system alternates the different signal ranges to capture transmissions in each of them and to identify the presence of devices.

The set of captured signals are transmitted by means of wires or wirelessly to a local and/or remote computer in the server where a joint analysis of said signals is carried out in real time and said signals are stored for subsequent analyses. Both the real time analysis and those analyses performed a posteriori serve for managing the lighting system of said establishment. For example, the areas of the shop where there is a greater or smaller number of visitors could be determined based on said signals in order to increase or decrease the light intensity depending on said number of visitors. In turn, coincidence patterns revealing the best context conditions can also be detected for generating specific customer behaviors, and therefore information to be sent to the signal devices which allow adapting the light conditions to the context.

Based on this information, the control means 2 send lighting to the controller 4 which sends the suitable signal to the lighting module 1 for managing the light produced by the lighting elements accordingly.

It is evident that several lighting devices according to the present invention will be placed in an establishment such that central control means will manage the network of devices for managing the lighting of the establishment accordingly.

The method for managing a lighting system of the present invention first comprises the step of detecting a series of parameters or signals such as the presence of users in an establishment.

This presence of users can be detected through mobile devices of the users themselves, for example, their mobile telephones through WiFi or Bluetooth connections.

Furthermore, in the method of the present invention other parameters or signals, such as the temperature, the humidity, the noise level, the brightness level, the distance from moving objects and/or people, or external events, can also be detected. All these parameters or signals can be detected by means of suitable sensors, such as light sensors, thermometers, microphones, cameras, wired or wireless data networks, etc.

For example, a temperature sensor based on a microprocessor integrated in a lighting fixture which can compile temperature data from time to time and send the data of the registers locally or over a network service (through HTTP requests or any other network protocol), can be used for detecting the temperature and humidity level. A clock determines the exact time at which the measurement has been taken, which time must be the same for this and for any other piece of data of the system.

Furthermore, a microphone in equipment based on a microprocessor integrated in the lighting system which can compile noise level data from time to time and send the data locally or over a network service (through HTTP requests or any other network protocol), can be used to detect the noise level.

Detecting the presence of people can be performed by means of installing a WiFi or Bluetooth antenna in a computer based on a microprocessor integrated in the lighting system which can start detecting the sounding signals of WiFi or Bluetooth devices, including the feed strength to deduce the estimated distance of the device from the antenna. The information is recorded from time to time or in a continuous manner and the data is recorded locally or over a network service (through HTTP requests or any other network protocol).

Detecting light levels can be performed by means of a sensor or a camera in equipment based on a microprocessor integrated with the lighting system which collects light level indicators from time to time and records the data locally or over a network service (through HTTP requests or any other network protocol).

Detecting the distance from moving objects or people can be performed by means of placing various cameras in equipment based on a microprocessor integrated with the lighting system which collects light level indicators and images (continuous video or images) and records the data locally or over a network service (through HTTP requests or any other network protocol). The images can be processed in the sensor itself or in a concentrator depending on the energy characteristics of each model.

Furthermore, the system operated by the method of the present invention will increase its delivery capacities by means of connection to other sensors and devices through WiFi, Bluetooth, ZigBee, PLC network, Ethernet or any other wired or wireless network. The system will also be capable of receiving events through a network connection or any other type of network protocol and will record them as they are produced.

All this data is integrated in a database which provides reports, correlations and patterns to the system's owner. All this data can be sent through the Internet to a group of servers which will be responsible for collecting the data in time real to perform an immediate action on the lighting system of a premise, and furthermore, they can also generate warnings, process pre-established reports on a daily basis, run business intelligence algorithms for extracting and analyzing key indicators using data mining techniques for mining the volumes of compiled data to provide, for example, behavioral patterns and hidden correlations between sales and the sales measurement point.

The following actions in particular can be performed in the lighting system:
    turning the lights on or off;
    controlling light intensity;
    changing the color of the lights; and
    changing the pattern of the lights in a modulated manner.
The following can particularly be performed by means of the method of the present invention:
    detecting popular movements in the space (see the map in FIG. 1);
    identifying the behavioral patterns of anonymous customers or users;
    identifying the behavior of mobile telephones which were in a specific position in the shop when a specific event occurs (for example, a specific product was acquired or tried out);
    identifying the conditions which are correlated with certain events (sales, trying out a product, etc.) with the conditions of the data of the shop (people present, light level, noise level, temperature level) in the exact same time pattern;
    analyzing the position of the lights in the space automatically and reporting same to the central servers;
    saving energy based on the presence of people in the place;
    saving energy based on the overlapping of lights;
    capturing necessary information for generating noise level maps in the central servers;
    capturing necessary information for generating temperature maps in the central servers;
    capturing necessary information for generating light level maps in the central servers;
    customizing the light projection on a wall based on the people who are facing the wall.
    detecting popular movements in the space.

Customers' behavioral patterns can also be anonymously identified by means of the method of the present invention because as customers check their mobile devices identified by their MAC address (anonymously through coding using an irreversible mathematical function), the system will be capable of determining the following information:
    the average shop visit duration by means of identifying the first and the last piece of evidence in a specific time period for each mobile telephone and calculating averages;
    frequency with which one and the same device visits the shop (by means of detecting evidence repetition in different visits);
    people passing by and entering the shop;
    people passing by and not entering the shop; and
    other behavioral patterns.

By correlating the presence of mobile telephones (detected through proximity to certain sensors) with events (such as purchase, product tasting, etc.), the paths and the main behavioral characteristics of the mobile telephones and therefore of their users, could be known, leading to the decision in relation to the lighting system. The reports identify the same visit patterns when the event occurred (for example, a customer passes by a product tasting area when he/she bought the tested product) or in prior or future events (for example, a customer purchases a car after visiting the shop more than 5 times).

This evidence will allow obtaining information about the path patterns (where the mobile telephone was before the event, where it was after the event, etc.), the behavioral patterns (such as the number of times the customer visited the shop before purchasing), and many other patterns that can be shown by data correlation.

It also allows identifying the conditions correlating certain events (sales, trying out a product, etc.) with the objective conditions of the shop (people present, light level, noise level, temperature level, etc.) in the same time pattern.

Generally, a very precise correlation of all the described metrics and data can be established by having all of them recorded in the same time pattern, thus determining the ideal conditions which best correlate with certain events, for example, product acquisition.

Correlations can also show if customers acquire more products if they are offered a certain path in the shop, for example. The analysis of the position of the lights in the space is performed automatically and it is reported to the central servers.

The system operated by the method according to the present invention based on the real time data of the presence of people in the shop is capable of regulating the light intensity or even deactivating some of the light points.

With the method of the present invention, it is possible to create intelligent walls depending on who is facing the walls, detecting every step made by a different individual facing the wall and generating the corresponding lighting effects.

Another advantage of the invention is to allow lighting-integrated temperature detection, achieving the actual premise temperature regardless of the light level and therefore regardless of the heat generated by the light detected by the sensor.

In order to solve that technical problem, each lighting fixture model is measured in a controlled environment in the entire range of external temperatures and in the entire range of light levels, producing a correction table which will be specific for each lighting fixture model and for a specific temperature sensor.

To allow detecting the light intensity of the light, the lighting level generated by the light itself and by other lights or by natural light must be isolated. The system will automatically tune in to be able to determine the light level produced by the light itself, the light level produced by the surrounding lights and natural light. This process will be carried out at least once every time a new light is detected in the lighting system.

Since the system will be capable of automatically detecting the presence of a new light in the shop (through wireless scanning or through camera identification), the method will start automatically at a time when the shop is closed (the system will have this information).

The method of determining in a closed shop and ideally overnight is as follows:
 all the lights will be turned off;
 natural light will first be measured;
 the first light will be turned on at different intensity levels;
 the first light itself will be measured and naturally generated light will be ruled out;
 all the other lights will also be measured, creating a map of how they relatively interact with one another when the first light is at each intensity;
 the first light will be turned off;
 all the other lights will be turned on at different intensities;
 the process is repeated for each light, creating a database and a light level map.

This automatic adjustment process can be deactivated and all the measurements will be saved as a backup copy and as reference.

To detect Bluetooth devices, the system will generate a device detection query and wait for at least 15 seconds to allow the devices to respond to the call.

In order to assure the anonymity of the collected data, the system will generate an MD5 hash and will only store that irreversible chain as a device identifier.

In order to detect Wi-Fi devices, the system will activate a Wi-Fi antenna in promiscuous mode and collect evidence of Wi-Fi signals in different Wi-Fi network channels.

In order to assure the anonymity of the collected data, the system will generate an MD5 hash and will only store that irreversible chain as a device identifier.

To assure that the measurements in all the sensors are synchronized, the sensors will send all the data in real time to the concentrator which is located in the same local network and which will be responsible for establishing the time.

Some examples of the detection of events that determine the conditions for turning the lighting system on/off are described below.

Event: A table in a restaurant has been empty for a while (detected by WiFi, Bluetooth and a camera in the light). Action: the light level for that table is reduced aiding in creating a more relaxing atmosphere.

Event: A new customer enters the restaurant and a free table automatically turns on its light gradually, inviting the customer to enter.

Despite the fact that reference has been made to a specific embodiment of the invention, it is evident for a person skilled in the art that the lighting device and the managing method described are susceptible to variations and modifications, and that all the mentioned details can be replaced with other technically equivalent details without departing from the scope of protection defined by the attached claims.

The invention claimed is:

1. A lighting device comprising:
 a plurality of lighting elements;
 a plurality of sensors receiving sensory stimuli of an establishment;
 a clock operable to output a time upon receipt of sensory stimuli at one or more of the plurality of sensors; and
 microprocessor connected with the plurality of sensors and with said plurality of lighting elements, such that said microprocessor sends lighting management instructions to said lighting elements depending on captured and processed information;
 a memory operable to store the received sensory stimuli and an associated time from the clock;
 an input/output connection, wherein the clock is operable to be synchronized from a remote device thought the input/output connection.

2. The lighting device according to claim 1, wherein said at least one sensor is an antenna receiving information from a plurality of mobile devices located in said establishment and/or temperature, humidity, sound and/or light intensity sensors, and/or a camera connected to said microprocessor.

3. The lighting device according to claim 1, further comprising one or more video cameras connected to said microprocessor.

4. The lighting device according to claim 1, further comprising a Bluetooth antenna connected to said microprocessor.

5. The lighting device according to claim 1, wherein said microprocessor is connected to said plurality of lighting elements through a lighting controller.

6. The lighting device according to claim 5, wherein said lighting controller comprises a converter configuring an output electric current or voltage.

7. The lighting device according to claim 5, wherein said lighting controller comprises a microswitch.

8. The lighting device according to claim 1, wherein said microprocessor comprises means for data input and output.

9. The lighting device according to claim 8, wherein said means for data input and output are a memory card reader and/or USB ports.

10. The lighting device according to claim 1, wherein said plurality of lighting elements are placed in a lighting module comprising a heat sink for dissipating the heat caused by said lighting elements, a printed circuit board on which the lighting elements are located and optical elements, through which the light emitted by said lighting elements passes.

11. The lighting device according to claim 1, wherein said lighting elements are light-emitting diodes.

12. The lighting device according to claim 1, wherein said at least one sensor and the microprocessor are housed in a casing.

13. The lighting device according to claim 1, wherein said at least one sensor comprises a USB controller associated therewith.

* * * * *